Figure 1:
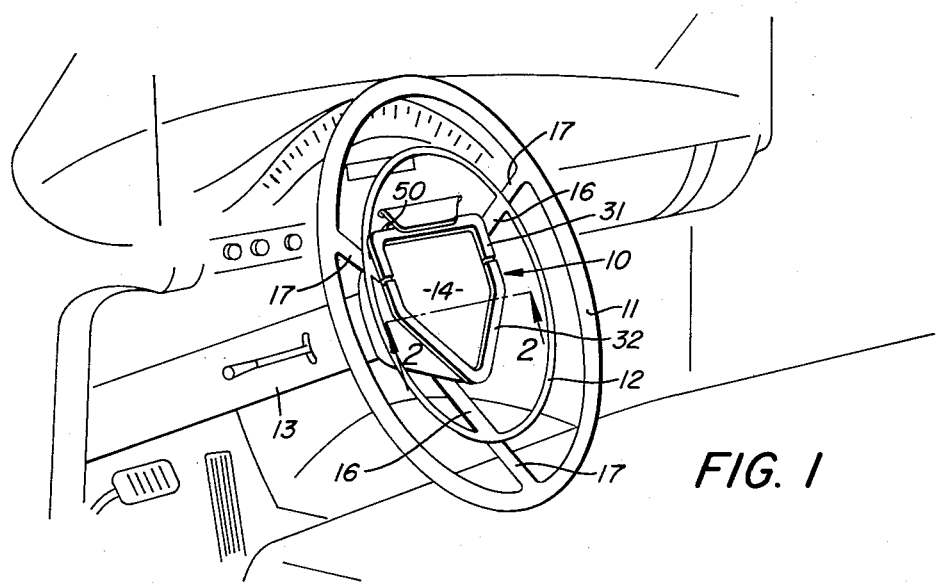

Dec. 5, 1961  E. L. ACKERMAN  3,011,802
ACCESSORY PAD FOR STEERING WHEELS OF AUTOMOBILES
Filed July 18, 1958  2 Sheets-Sheet 1

INVENTOR.
EUGENE L. ACKERMAN
BY
ATTORNEY

Dec. 5, 1961   E. L. ACKERMAN   3,011,802
ACCESSORY PAD FOR STEERING WHEELS OF AUTOMOBILES
Filed July 18, 1958   2 Sheets-Sheet 2
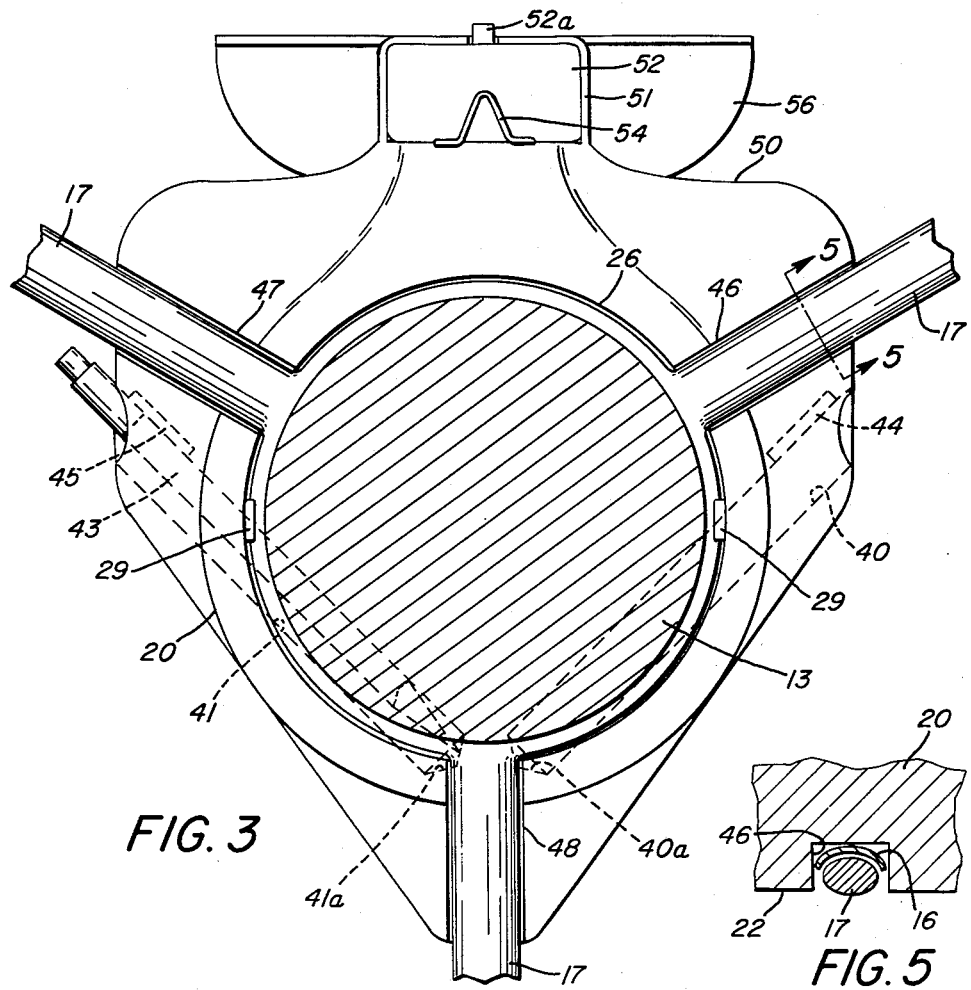
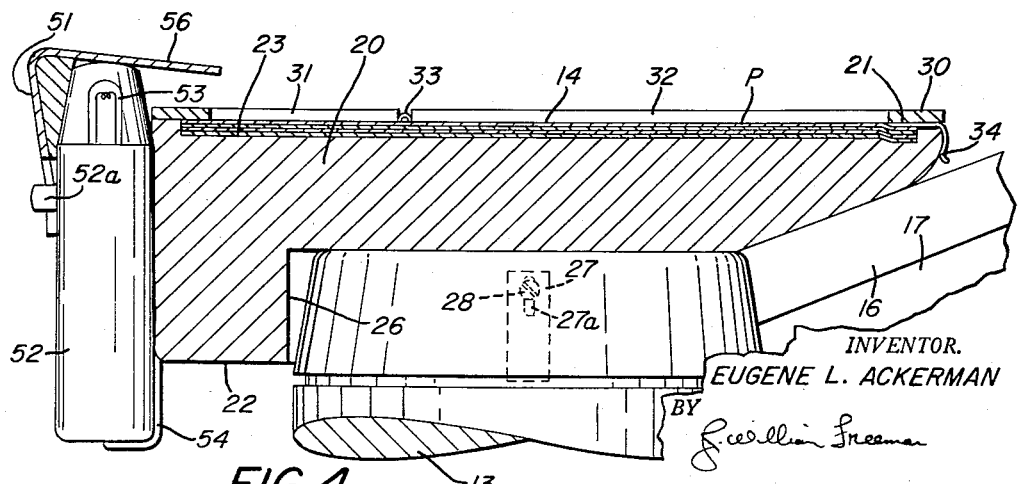
INVENTOR.
EUGENE L. ACKERMAN
BY
ATTORNEY

United States Patent Office 3,011,802
Patented Dec. 5, 1961

3,011,802
ACCESSORY PAD FOR STEERING WHEELS OF AUTOMOBILES
Eugene L. Ackerman, 431 Broadway, Cuyahoga Falls, Ohio
Filed July 18, 1958, Ser. No. 749,380
5 Claims. (Cl. 281—15)

This invention relates to the art of accessory pads, or writing tables, and in particular has reference to a new and improved type of accessory pad that is designed for use on the steering wheel of an automobile.

In the prior art, it has long been known that a writing pad of this general type can be mounted in association with the steering column of the automobile to provide a flat writing surface for use in making notes, etc. However, devices of this general character have been uniformly characterized by the fact that the same require a more or less permanent attachment to the steering wheel of the automobile, with the result that the same must be either especially contoured or otherwise formed to fit into place on the steering unit.

As an additional disadvantage of the known prior art type of device, it has been further found that the use of the same invariably effects the operation of the horn ring that is normally associated with the steering wheel of the automobile. In some cases, the operation of this horn ring is completely eliminated, and in other cases, it is required that the pad itself be depressed to effectuate operation of the horn ring.

In addition to the above disadvantages, further limitation in use of the known prior art devices has occurred as a result of certain safety advances that have been made with regard to the construction of the steering wheel portion of an automobile. Specifically, in recent years, it has been found that the safety of the driver can be improved if the steering column is recessed with respect to the plane of the steering wheel. Thus, in modern day automobiles, it is customary to employ a structure wherein the hub of the horn ring is recessed with respect to the plane of the steering wheel. It is believed apparent that the majority of prior art devices above discussed would not be usable in this situation because of the fact that the horn button, for example, would be spaced from the accessory device that is mounted on the steering wheel itself.

It has been discovered that the aforementioned disadvantages of the known prior art can be obviated by making a unitary body portion that is releasably attached to the hub of the steering wheel, with adequate provision being made during such attachment to provide for clearance of the horn ring so that the same can be freely operated in normal fashion, notwithstanding the presence of the improved accessory pad on the steering wheel.

It has further been found that improved use of the accessory can be obtained by providing storage and lighting means with the pad, so as to permit habitual use at all hours.

It is accordingly the principal object of this invention to provide an accessory pad of the character described that is releasably associated with the steering mechanism of an automobile and which does not interfere with normal use of the same as the horn ring associated therewith.

It is still further an object of this invention to provide a device of the character described wherein storage provision is made for the writing implement employed, and which is further characterized by the fact that the same has associated therewith a lighting source, permitting use of the device during periods of darkness.

These and other objects of the invention will become more apparent upon a reading of the following brief specification, considered and interpreted in the light of the accompanying drawings.

Figure 2:
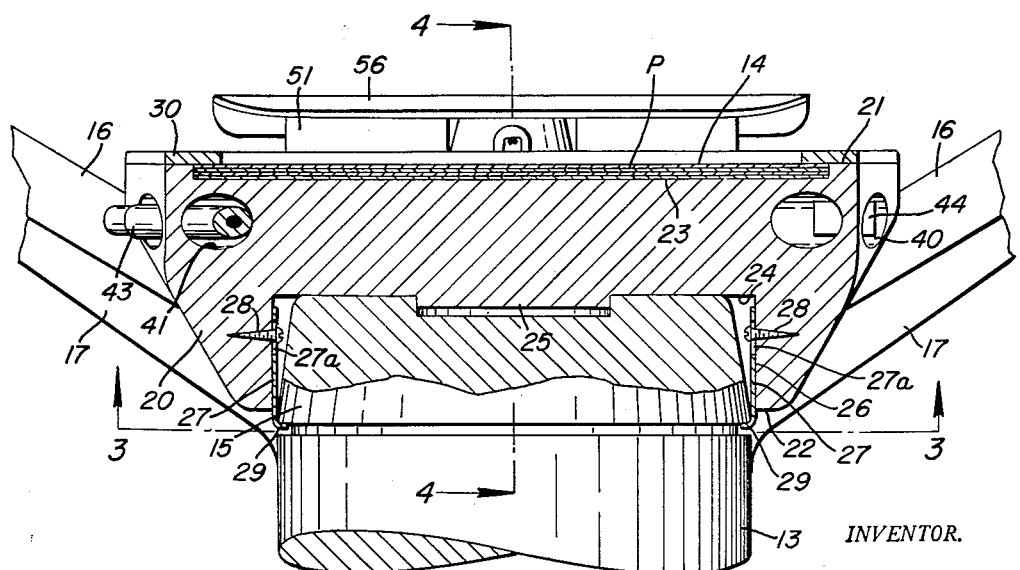

Of the drawings:
FIGURE 1 is a perspective view showing the accessory pad mounted on the steering wheel on an automobile.
FIGURE 2 is a sectional view taken on the lines 2, 2 of FIGURE 1.
FIGURES 3 and 4 are sectional views taken on the lines 3, 3 and 4, 4 of FIGURE 2 of the drawings.
FIGURE 5 is a sectional view taken on the lines 5, 5 of FIGURE 3.

Referring now to the drawings, and in particular to FIGURE 1, the improved accessory pad, generally designated by the numeral 10, is shown releasably mounted in association with an automobile steering wheel 11, and the horn ring 12 that is associated therewith; the arrangement being such that the accessory pad 10 is mounted on the free end of steering column 13, with writing surface 14 of the pad 10 being disposed beneath the plane of the steering wheel 11 and the horn ring 12, as is clearly shown in FIGURE 1 of the drawings. Additionally, and as shown in FIGURE 2, steering column 13 includes a horn button 15 that is shiftable with respect to column 13 so as to effectuate blowing of the horn upon movement of the button 15 towards the steering column 13. In this regard, it is to be understood that the horn button 15 has radial spokes 16, 16 that terminate in the horn ring 12, while spokes 17, 17 terminate in steering ring 11, as is clearly shown in FIGURES 1 and 2 of the drawings.

Referring next to FIGURES 2, 3 and 4 for a detailed consideration of the structure of the accessory pad 10 per se, it will be seen that the same includes a main body portion 20 having top and bottom planar faces 21 and 22 respectively, with the planar face 21 being recessed, as at 23, for reception of paper P, while the bottom surface 22 is provided with a relatively deep cavity 24 that is provided for reception of the horn button 15, as is clearly shown in FIGURE 2 of the drawings. Additionally, the cavity 24 has a central boss 25 that serves to center the body portion 20 with respect to the horn button 15.

In addition to the aforementioned component parts, the side wall 26 of the cavity 24 includes a series of spring tines 27, 27 that are preferably attached to the body 20 by the use of screws 28, 28. These tine members 27, 27 have their lower end provided with hook-like portions 29, 29 that engage over the undersurface of the horn button 15, with the hook portions 29, 29 sliding over the inclined surface of the horn button 15 until the same snap in place, as shown in FIGURE 2. Preferably, and as shown best in FIGURE 2, the individual tines 27, 27 are provided with slots 27a, 27a to facilitate adjustment of the amount of projection of the hook portions 29 beyond the bottom surface 22. In this manner, the accessory pad 10 can be employed with horn buttons 15 of different height dimensions by merely controlling the amount of projection of the hook portions 29, 29.

To the end of releasably retaining the paper P in place within undercut 23, the peripheral edge of the top face 21 of the body 20 is covered by a flat frame member 30, with the U-shaped upper portion 31 of this plate member being secured to body 20 in conventional manner, while the V-shaped portion 32 thereof is hinged, as at 33 (see FIGURE 4), to the member 31 to facilitate removal of the paper P upon movement of frame portion 32. A spring clasp 34 normally retains the frame portion 32 in closed, coplanar relationship with frame portion 31.

In addition to the aforementioned component parts, the upper area of the body member 20 is provided, as best shown in FIGURE 3, with inwardly extending bores 40, 41 with these bores terminating in internal end walls 40a and 41a. In this manner, pencil 43, or other writing instrument, can be received therein, as is clearly shown in the drawings, with the pencil being retained in place during the use of the pad 10 by magnetic inserts 44 and 45 that are preferably provided adjacent the open end of bores 40 and 41.

Referring next to FIGURES 3 and 5, it will be seen that the cavity 24 further includes radial slots 46, 47 and 48, with these slots communicating the exterior of the body 20 with the cavity 24. In this manner, the spokes 16, 16 of the horn ring 12 and spokes 17, 17 of the steering wheel 11 can be accommodated freely within the slots 46, 47 and 48. To this end, and as shown in FIGURE 5, these slots are provided with ample clearance so as to permit movement of the spokes 16, 16 relatively thereof, and in this manner movement of the horn ring 12 will result in the horn button 14 being depressed because of the permissive relative movement of the spokes 16, 16 within slots 46, 47 and 48.

For the purpose of providing a light source to illuminate the writing surface 14, the top edge surface 50 (FIGURE 1) of the accessory unit 10 is provided with a U-shaped bracket 51 that is fixed with respect to the body 20 in known manner. Encircled by this just-described bracket 51 is a flash light unit 52, having a bulb 53, with the unit 52 also being supported on a depending flange 54 that extends downwardly beyond the lower surface 22, as best shown in FIGURE 4 of the drawings. Also, and as shown in FIGURES 2 and 4, the bracket 51 has attached thereto a shield 56, with this shield 56 serving to diffuse writing from bulb 53 onto the light surface 14, and upon movement of the operating button 52a, a light source will be diffused over the writing surface 14. It is believed clear that the spring flange 54 permits ready removal of the flash light member 52 for use at a point that is remote from the accessory pad 10.

In use or operation of the improved accessory pad 10, it will first be assumed that the component parts have been assembled as indicated in the drawings, and further that the flash light 52, pencil 43 and paper P have been positioned in their respective places with respect to the pad 10.

At this time, the user merely grasps the edges of the unit 10 and after proper alignment of the cavity 25 with respect to the horn button 15, merely depresses the entire unit 10 downwardly over the horn button. As a result of this movement, the hook edges 29, 29 will slide downwardly over the peripheral edge surface of the button 15 (FIGURE 2) until the same snap over the lower edge thereof and reach the position of FIGURE 2, with it being assumed that the proper degree of projection of tines 27, 27 has been ascertained prior to such installation.

With the device thus assembled, the same will be retained firmly in place, and to use the same, it is merely necessary that the user remove the pencil 43 and write on the surface. At such time as a fresh piece of paper is required, the user merely pivots the frame portion 32 about hinge 33, removes the used paper and re-pivots the frame portion 32 into the locked position of FIGURE 2. If a light is required, it is merely necessary that button 52a be operated, at which time the writing surface 14 will be fully illuminated.

Removal of the device is facilitated by manual manipulation of the tine members 27, 27 out of engagement with the undersurface of the horn button 14, followed by lifting movement of the entire unit 10 out of contact with the steering portion of the car.

It will be seen from the foregoing that there has been provided a new and improved type of accessory pad for use on steering wheel of an automobile. It has been shown how the accessory pad lends itself to rapid attachment and detachment with respect to the same and further, how the novel mounting of the same on the horn button permits full use of the horn ring without impeding the operation thereof in any manner. It has further been shown how the contouring and slotting of the body to provide communication with the central cavity provided on the underside permits recessing of the unit beneath the plane of the steering wheel so that the same does not, in any way, interfere with the driving or safety of the operator during use of the same.

While a complete and full disclosure of the invention has been made in accordance with the dictates of the patent statutes, it is to be understood that the invention is not intended to be so limited. Accordingly, changes in size, shape and configuration are contemplated as being within the scope of the invention. Similarly, while the body portion of the device has been indicated as being of a solid material, it is to be understood that the material involved could be either metal, plastic or wood.

Accordingly, modifications of the invention may be resorted to without departing from the spirit hereof, or the scope of the appended claims.

What is claimed is:

1. An accessory pad holder for use with an automobile steering wheel having a steering column and a horn assembly including a horn ring and a horn button connected by at least one radial spoke, said assembly being shiftably associated with said column as an integral unit, comprising; a unitary rigid body member having one face thereof provided with an inwardly extending cavity and at least one radial slot extending radially of said cavity and communicating the same with the exterior of said body; said cavity being telescopically received around said button in surface to surface contact therewith and with said spoke being loosely received in said slot; and spring clip means releasably connecting said body member with said horn assembly whereby said body and said horn assembly may move relatively of said column as a unit.

2. An accessory pad holder for use with an automobile steering wheel having a steering column and a horn assembly including a horn ring and a horn button connected by at least one radial spoke, said assembly being shiftably associated with said column as an integral unit, comprising; a unitary rigid body member having a writing surface and additionally having one face thereof provided with an inwardly extending blind cavity and at least one radial slot extending radially of said cavity and communicating the same with the exterior of said body; said cavity being telescopically received around said button in surface to surface contact therewith and with said spoke being loosely received in said slot; spring clip means releasably connecting said body member with said horn assembly whereby said body and said horn assembly may move relatively of said column as a unit.

3. The device of claim 2 further characterized by the fact that said writing surface is recessed with said recessed surface being covered at its marginal edge by a frame member; said frame member being hingedly connected whereby a writing pad can be positioned on said surface and retained in place thereon by said frame.

4. The device of claim 2 further characterized by the presence of light means disposed exteriorly of said body and illuminating said writing surface.

5. An accessory pad holder for use with an automobile steering wheel that includes a steering column and a horn button shiftably associated therewith, comprising; a unitary rigid body member having one face thereof provided with an inwardly extending cavity telescopically received around said horn button in surface to surface contact therewith; and spring clip means releasably connecting said body member with said horn button, whereby said body and said button move relatively of said column as a unit; said spring clip means projecting beyond the face of said body and being adjustable with respect to the extent of such projection.

References Cited in the file of this patent
UNITED STATES PATENTS

| | | |
|---|---|---|
| 2,650,836 | Berman | Sept. 1, 1953 |
| 2,663,576 | Berman | Dec. 22, 1953 |
| 2,732,448 | Berner et al. | Jan. 24, 1956 |